(No Model.)  C. H. BILL.  2 Sheets—Sheet 1.

DEVICE FOR MAKING CRAYON MOLDS.

No. 273,442.  Patented Mar. 6, 1883.

Witnesses
S. N. Piper
E. B. Pratt

Inventor
Charles Henry Bill
by R. Kidd, atty.

(No Model.) 2 Sheets—Sheet 2.
C. H. BILL.
DEVICE FOR MAKING CRAYON MOLDS.
No. 273,442. Patented Mar. 6, 1883.
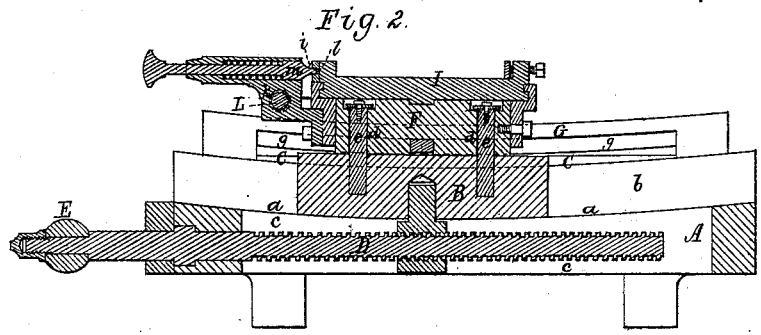
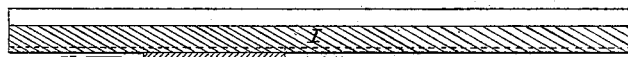
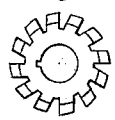
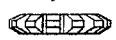
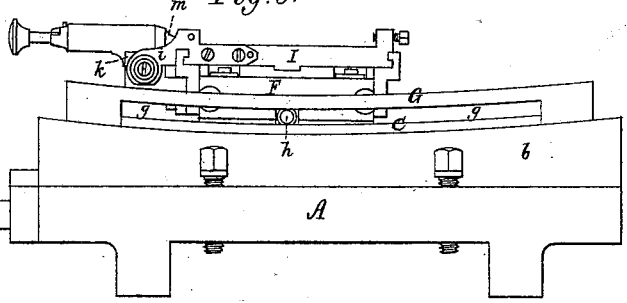
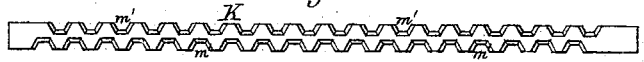
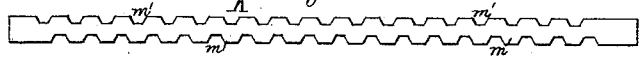
Witnesses.
S. N. Piper
E. B. Pratt
Inventor.
Charles Henry Bill.
by R. H. Eddy, atty

United States Patent Office.

CHARLES H. BILL, OF WALTHAM, MASSACHUSETTS, ASSIGNOR TO ZENAS PARMENTER, OF SAME PLACE.

DEVICE FOR MAKING CRAYON-MOLDS.

SPECIFICATION forming part of Letters Patent No. 273,442, dated March 6, 1883.

Application filed November 16, 1882. (No model.)

*To all whom it may concern:*

Be it known that I, CHARLES H. BILL, of Waltham, in the county of Middlesex, of the State of Massachusetts, have invented a new and useful Improvement in Machinery for the Manufacture of Crayon-Molds; and I do hereby declare the same to be described in the following specification and represented in the accompanying drawings, of which—

Figure 1:
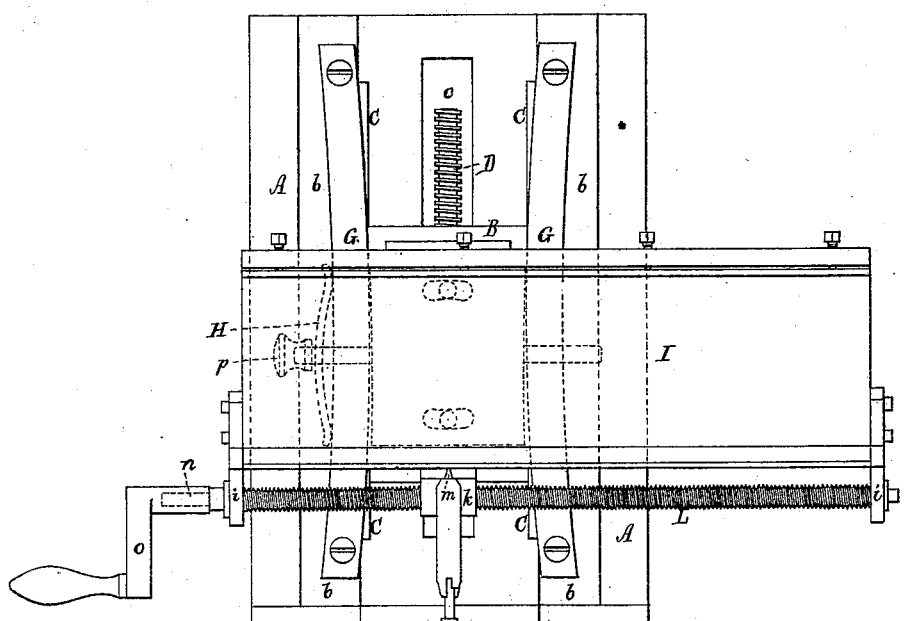
Figure 13:
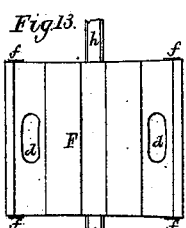
Figure 14:
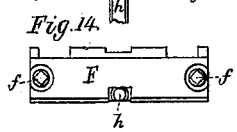
Figure 4:
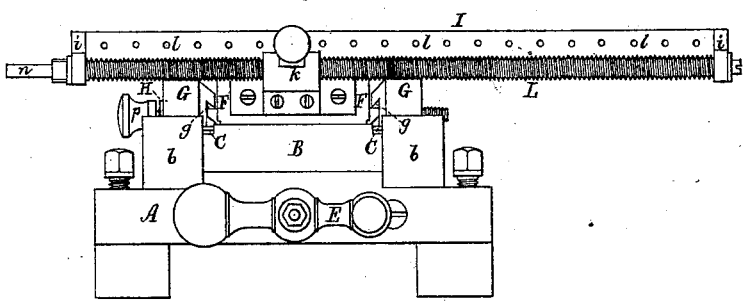

Figure 1 is a top view, Fig. 2 a longitudinal section, Fig. 3 a transverse section, Fig. 4 a rear end view, and Fig. 5 a side elevation, of a machine embodying my invention. Figs. 6 and 7 are opposite edge views of a crayon-mold plate as made with the aid of such machine and by a rotary cutter, a top view of which is given in Fig. 8 and a side view in Fig. 9. Fig. 10 is a side view, and Figs. 11 and 12 end views, of a crayon as cast in a mold formed by aid of the machine. Fig. 13 is a top view, and Fig. 14 is a side view, of the block F, hereinafter referred to and described.

The said cutter is to be mounted on a rotary shaft—as the mandrel of a turning-lathe, for instance—the machine at the same time resting on and being fastened down upon the rails of the lathe. While the cutter is in revolution the plate which is to be scored or channeled by it is moved transversely along underneath the said cutter, which, during such movement, cuts or grooves the plate transversely.

The nature of my invention is defined in the claim hereinafter presented.

The crayons whose mold is formed by the aid of such machine are hexagonal in transverse section, and are prismoids having curved tapering sides, one of such crayons being shown in elevation in Fig. 10 and in end views in Figs. 11 and 12.

In the drawings, A denotes the base-plate of the machine, it being on top curved lengthwise, as shown at *a*, where, between two rails, *b b*, parallel to each other and arranged on the frame in manner as represented, (the bed-plate at its middle is slotted lengthwise, as shown at *c*,) a rectangular block, B, of metal, rests upon the said curved part of the bed, and is arranged between the two rails *b b*, it being prevented from rising off such curved part by two flanges or bars, C C, fixed on the tops of the rails, and curved in parallelism with the curve of the bed. The flanges or bars C lap on the block or extend into grooves made in it. The block B and the base-plate A are provided with a screw, D, for moving the block on the bed, such screw having at one end a handle or crank, E.

Resting on the block B is another block, F, a top view of which is given in Fig. 13 and a side view in Fig. 14. In this block F are two slots, *d d*, which are arranged in it as shown, and receive two short cylindrical posts or standards, *e e*, extending upward from the block B. Near its corners, the block F has screwed tightly into it at each of its two opposite sides two adjusting-screws, *f f*. These screws are directly between two guides, G G, each of which is curved both horizontally and vertically in manner as represented. These guides are fixed on the two rails *b b*, and are parallel to the curved surfaces of the latter, there being between each guide and its rail a long curved space, *g*. Screws *h h*, projecting from the block F and formed on a single rod arranged with such block and fastened to it, as shown in Fig. 3, go through the spaces *g g* laterally thereof. One of these screws, provided with a nut, *p*, goes through the middle of a bow-spring, H, which at its ends bears against the curved outer side of one of the guides G and that of one of the flanges C C. On screwing up the nut, the heads of the next adjacent screws *f f* will be drawn closely against the inner edge of the guide G next to them.

From the above it will be seen that the block F can turn and move more or less laterally on the block B, and as the latter is moved endwise by its screw D and in a curved path the block F will move in a like manner, and also in another curved path, by reason of the heads of the screws *f f* being borne and moved against the guide G.

Adapted to the block F, so as to slide rectilinearly thereon and crosswise of it, is the carrier I for supporting the mold-plate K to be grooved by the rotary cutter, such mold-plate being held firmly in the carrier by suitable clamps or devices.

Arranged as shown and adapted to revolve in lugs *i i*, projecting from the carrier I, at its ends, is a long screw, L, which screws through an ear, $k$, extending from the block F, as represented. The screw, while being revolved, moves the carrier I in a direction longitudinally of it. On the edge next the screw the carrier is provided with a series of notches or holes, $l$, arranged at equal distances apart, they being to receive the inner end of a spring-bolt, $m$, suitably applied to the ear $k$. The holes $l$ determine the distances to which the carrier is to be moved for having formed in it the series of semi-matrices $m'$ in one side of the mold-plate K. The screw L has a prismatic head, $n$, to receive a cranked key, $o$, for revolving such screw.

To use the machine, the bow-spring H and nut $p$ are first to be placed on one of the screws $h$ and the nut turned up, so as to draw the two next adjacent adjusting-screws $f$ into contact with the inner side of the next adjacent guide G, the bow-spring serving to insure such contact, while the block F may be moved either forward or backward. The bolt $m$ being in the first hole of the series of holes $l$, the block B is to be advanced by the screw D so as to move the block F and the mold-plate carrier forward to and under the rotary cutter, in order for it to plow or cut through the mold-plate transversely thereof and partially form a semi-matrix therein. This having been done, the mold-plate carrier is to be moved and set to the proper distance for another and like cut to be made in order to form part of the next semi-matrix, after which the mold-plate carrier is to be again moved under the rotary cutter. These operations are to be continued until the last of the semi-matrices may have been so partially formed, after which the nut $p$ is to be unscrewed, and it and the bow-spring are to be applied to the other screw $h$, and the nut is to be set up, so as to force the other two adjusting-screws $f$ against the other guide G. By proceeding as before the remaining part of each semi-matrix may be cut.

With such a machine mold-plates for casting crayons, shaped as represented, can be grooved on either or both sides of each, which can be rapidly and very perfectly accomplished.

I claim—

The machine or combination substantially as described, consisting of the base-plate A, curved on its upper surface, as described, the block B, provided with the operative screw D, the guides G G, curved as shown, the block F, having the screws $f$ $h$ L, nut $p$, bow-spring H, and bolt $m$, as explained, and the mold-plate carrier I, adapted to the block F, and provided with the series of setting-holes $l$ to receive the end of the bolt, all being constructed and applied to operate essentially in manner and for the purpose as set forth.

CHARLES H. BILL.

Witnesses:
CHAS. F. STONE,
F. M. STONE.